United States Patent
Yang et al.

(10) Patent No.: US 8,045,285 B1
(45) Date of Patent: Oct. 25, 2011

(54) DATA SYNCHRONIZATION FOR BIT INSERTION OR DELETION

(75) Inventors: Xueshi Yang, Sunnyvale, CA (US); Gregory Burd, San Jose, CA (US)

(73) Assignee: Marvell International Ltd., Hamilton (BM)

(\*) Notice: Subject to any disclaimer, the term of this patent is extended or adjusted under 35 U.S.C. 154(b) by 188 days.

(21) Appl. No.: 12/389,118

(22) Filed: Feb. 19, 2009

Related U.S. Application Data

(60) Provisional application No. 61/039,272, filed on Mar. 25, 2008.

(51) Int. Cl.
*G11B 5/09* (2006.01)
*G11B 27/36* (2006.01)

(52) U.S. Cl. .............................. 360/51; 360/31; 360/53
(58) Field of Classification Search .................. None
See application file for complete search history.

(56) References Cited

U.S. PATENT DOCUMENTS

| | | | |
|---|---|---|---|
| 7,787,205 B2 \* | 8/2010 | Kuznetsov et al. | 360/53 |
| 2008/0106816 A1 \* | 5/2008 | Silvus | 360/51 |
| 2009/0122441 A1 \* | 5/2009 | Yang | 360/77.08 |

\* cited by examiner

*Primary Examiner* — Daniell L Negron
*Assistant Examiner* — Regina N Holder

(57) ABSTRACT

In an implementation, a media drive includes bit patterned magnetic media and a module. The module is to cause data encoded by one or more error correction codes to be written on the bit patterned magnetic media with a constraint that is configured to be used to synchronize the data if a bit insertion or deletion occurs.

10 Claims, 10 Drawing Sheets

DATA SYNCHRONIZATION FOR BIT INSERTION OR DELETION

RELATED APPLICATION

This application claims priority under 35 U.S.C. §119(e) to U.S. Provisional Application Ser. No. 61/039,272, filed on Mar. 25, 2008, the entire disclosure of which is hereby incorporated by reference in its entirety.

BACKGROUND

In a conventional magnetic media drive, a continuous film of magnetic material is typically used to store bits of data. Each bit is traditionally defined on the magnetic material through the action of a write head of the media drive. Thus, the locations of the bits of the media drive were usually defined by the action of the write head itself and not by the magnetic media on which the bits were written.

In order to increase the amount of bits that may be stored on traditional magnetic media, techniques were developed to decrease the amount of space consumed by each of the bits on the magnetic media. Thus, the amount of bits that could be stored on a given area of the traditional magnetic media increased as the amount of space consumed by each of the bits decreased. However, reliability of the bits to persist data may also decrease as the amount of space consumed by each of the bits decreases. For example, heat may cause bits to change a magnetic orientation when the amount of magnetic material used to store each of the bits becomes sufficiently small. Consequently, storage of data using these bits may become unreliable.

Accordingly, bit patterned magnetic media has been developed. Bit patterned magnetic media may physically isolate magnetic material that is used to store the bits as separate islands. This isolation helps retain magnetic orientation of the bits and therefore increases the reliability of data storage. However, conventional techniques that are commonly used to write to and read from bit patterned magnetic media may cause data errors.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In an implementation, a violation degree is measured indicating a number of insertions plus deletions for an insertion/deletion pattern in data blocks of data received at a receiver. The insertion/deletion pattern is output that has a least measure violation degree and the data is synchronized based on the output insertion/deletion pattern.

In an implementation, a plurality of data blocks and respective constraints are read from bit patterned magnetic media. Each of the data blocks is encoded according to one or more error-correction-code techniques and each of the constraints is calculated from a respective one of the data blocks. A determination is made as to whether the respective constraints have been violated for the plurality of data blocks and if so, at least one violation of at least one of the constraints localized using a trellis-based algorithm.

In an implementation, a media drive includes bit patterned magnetic media and a module. The module is to cause data encoded by one or more error correction codes to be written on the bit patterned magnetic media with a constraint that is configured to be used to synchronize the data if a bit insertion or deletion occurs.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
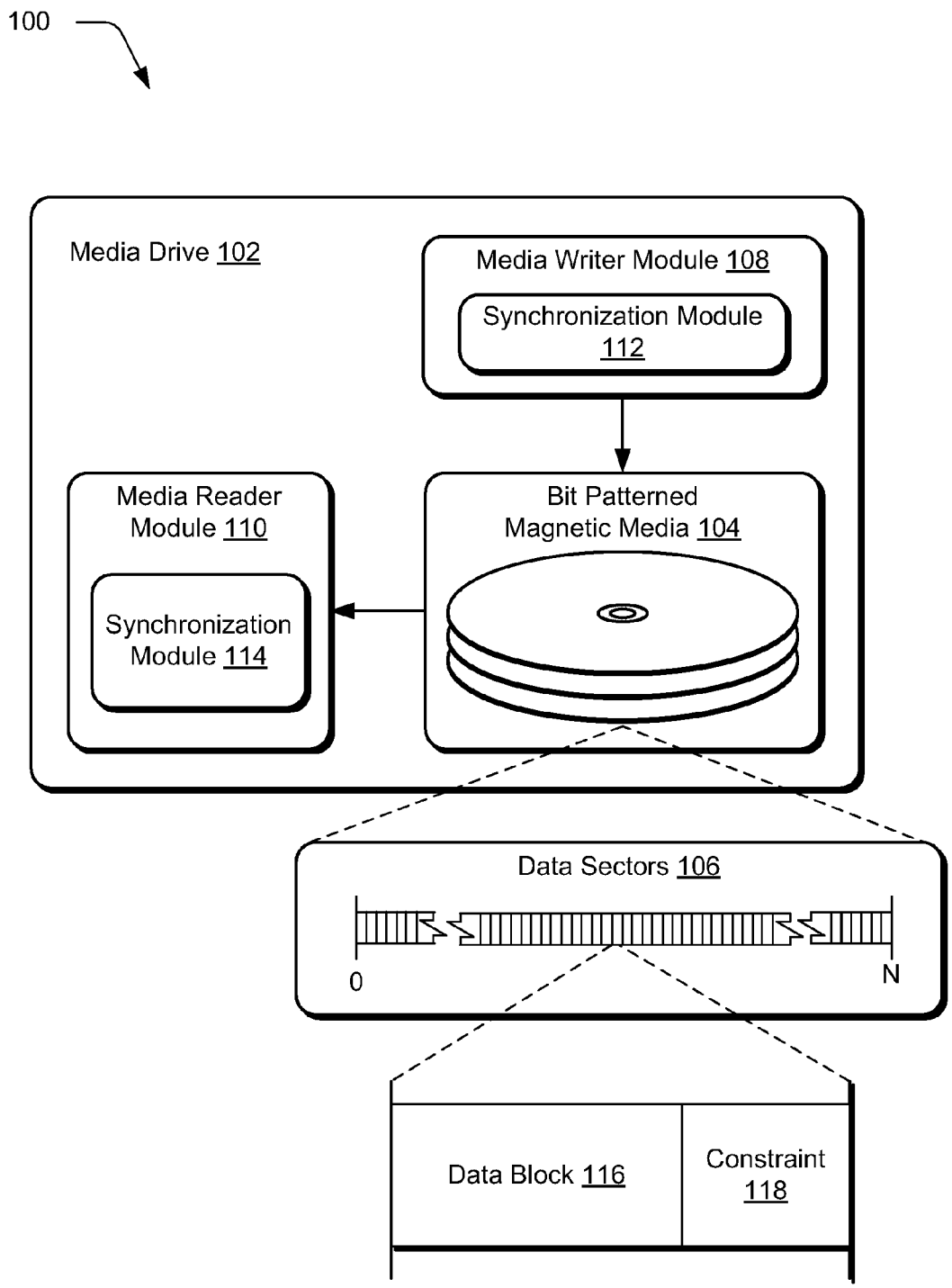
FIG. 1 is an illustration of an example operating environment that is configured to employ bit patterned magnetic media data format techniques.

Techniques to increase the amount of data storage on magnetic media typically involved decreasing an amount of space used to store each bit on the magnetic media, thereby increasing data density on the magnetic media. However, as a size of each of the bits (the amount of space of the magnetic media consumed) decreased so too did the ability of the magnetic media to persist data using those bits. For example, the size of the bits may decrease to a point at which heat may cause a change in magnetic orientation of the bits, such as to cause a bit to be changed from a one to a zero and vice versa.

Bit patterned magnetic media was developed to address these issues such that an amount of data that may be stored in a given area on magnetic media may continue to increase. Bit patterned magnetic media is configured such that the magnetic material used to store each of the bits is isolated, e.g., formed in islands. This isolation helps the magnetic material retain an orientation, thereby increasing reliability of the bit-patterned magnetic media to store data.

However, conventional techniques developed to write or read data from bit patterned magnetic media may corrupt the data. In some instances, a write head used to write data (e.g., a series of bits) to bit patterned magnetic media may lose synchronization with the bit patterned magnetic media. This loss of synchronization may then cause data errors as bits of data are added or omitted. For instance, a write head of a media drive may write bits at a slower rate than a rate at which the islands of the bit patterned magnetic media are encountered, thereby causing additional bits to be written to the bit patterned magnetic media. Similarly, the write head may write bits at a faster rate than a rate at which the islands are encountered, thereby causing bit omission. Therefore, a loss of synchronization between the write head and the islands in the bit patterned magnetic media may cause data corruption. Similar corruption may be observed when a read head of a media drive loses synchronization with the islands of the bit patterned magnetic media such that bit insertions or omissions may occur.

Bit patterned magnetic media data constraints are described. In an implementation, a constraint is included within data in a data sector. In this way, an error that occurs within data in the data sector may be detected by verifying the constraint. For example, the constraint may be implemented by a single parity check value that is based on data within the segment. Therefore, the constraint may be used to verify whether the data has become corrupted, such as by comparing the constraint stored with the data with another constraint that is calculated for the data. When the constraint is violated (e.g., the stored and calculated constraints do not match), data corruption caused by a bit insertion or omission may be localized. It should be realized that a constraint may be implicit (e.g., embedded in data) and therefore a constraint may be provided without being separate from the data. A variety of different techniques may be employed that involve constraints and are not limited to bit-patterned media, further discussion of which may be found in the following sections.

In the discussion that follows, example operating environments are first described that may incorporate the bit patterned magnetic media data constraint techniques. Example procedures are also described that may be employed in the example operating environments, as well as other environments. In instances in the discussion of the procedures, reference will be made to the environments by way of example. However, implementation of the procedures is not limited to the environments described herein. Likewise, the environments and the devices contained therein are not limited to performance of the procedures.

Example Environment

FIG. 1 illustrates an example operating environment 100 that is configured to employ one or more techniques relating to a bit patterned magnetic media data constraints. The illustrated operating environment 100 includes a media drive 102 having bit patterned magnetic media 104. The bit patterned magnetic media 104 is computer-readable to store data as a series of bits arranged across islands of magnetic material in a plurality of data sectors 106. In the following discussion, the data sectors 106 may be representative of one or more data sectors and therefore by convention may be referenced as a data sector 106, data sectors 106, a plurality of data sectors 106, and so on.

The bit patterned magnetic media 104 may be formed in a variety of ways. For example, magnetic material used to store bits may be arranged as a series of islands that are physically separated from each other. Therefore, the bit patterned magnetic media 104 predefines where bits are to be stored on the media through use of the islands, as opposed to a write head as was conventionally utilized by continuous magnetic media devices. In other words, the islands of magnetic material that form the bit patterning may define where bits are storable by the bit patterned magnetic media. In an implementation, the bits are lithographically defined using magnetic material to form the bit patterned magnetic media 104.

The media drive 102 is further illustrated as including a media writer module 108 and a media reader module 110. The media writer module 108 is representative of functionality of the media drive 102 to write data to the bit patterned magnetic media 104. Similarly, the media reader module 110 is representative of functionality of the media drive 102 to read data from the bit patterned magnetic media 104. Although the media writer module 108 and the media reader module 110 are illustrated separately for purposes of discussion, these modules may share components of the media drive 102, such as a hard disk head and arm configured to read from and write to the bit patterned magnetic media 104.

As previously described, errors may occur when a write head is not synchronized with a pattern of magnetic material that is used to store bits on the bit patterned magnetic media 104. In particular, bit insertions and omissions may occur when a write head progresses at a rate that is slower or faster than a rate at which individual islands of magnetic material that are used to store bits are encountered, respectively. Similar bit insertions and omissions may occur when a read head progresses at a rate that is slower or faster than a rate at which individual islands of magnetic material that are used to store bits are encountered. Conventional error correction codes employed by traditional media drives are not well suited to correct bit insertions and omissions. On the other hand, conventional error correction codes that are designed for bit insertion and/or omission may have a relatively low CODE rate, implying a significant amount of redundancy bits are to be introduced.

The media writer module 108 and the media reader module 110 are illustrated as including respective synchronization modules 112, 114. The synchronization modules 112, 114 are representative of functionality of the respective media writer and media reader modules 108, 110 to employ one or more constraints for respective one or more data blocks, an example of which is shown in FIG. 1 as data block 116 and constraint 118. Although the constraint 118 is illustrated separately, it should be apparent that the constraint may be implicit (e.g., embedded) within the data block 116. In one or more implementations, the constraint 118 is configured to verify whether data in the data block 116 has been corrupted. For example, the constraint 118 may be calculated from the data in the data block 116 such that if a change to the data is encountered, the constraint 118 is violated for a subsequent calculation of the constraint using the corrupted data. In this way, the constraint 118 may serve to localize corruption in the data block 116 and resynchronize subsequent data blocks For example, for SPC constrained data blocks 116, the data block satisfies the even parity constraint and thus this constraint 118 is not explicit in the data block 116, i.e., the constraint 118 is not provided as an explicit/separate constraint segment in the data block 116 but a receiver may have knowledge of it. In another example, a block of data may be mapped into another block of data that satisfy predetermined constraints. The mapping may be non-systematic (i.e., original data bits are not preserved) and hence there are no explicit user data/constraint boundaries. Therefore, although the following discussion may include instances in which the constraint 118 is referenced as a separate entity, it should be readily apparent that the constraint 118 may also be implicit.

Figure 2:
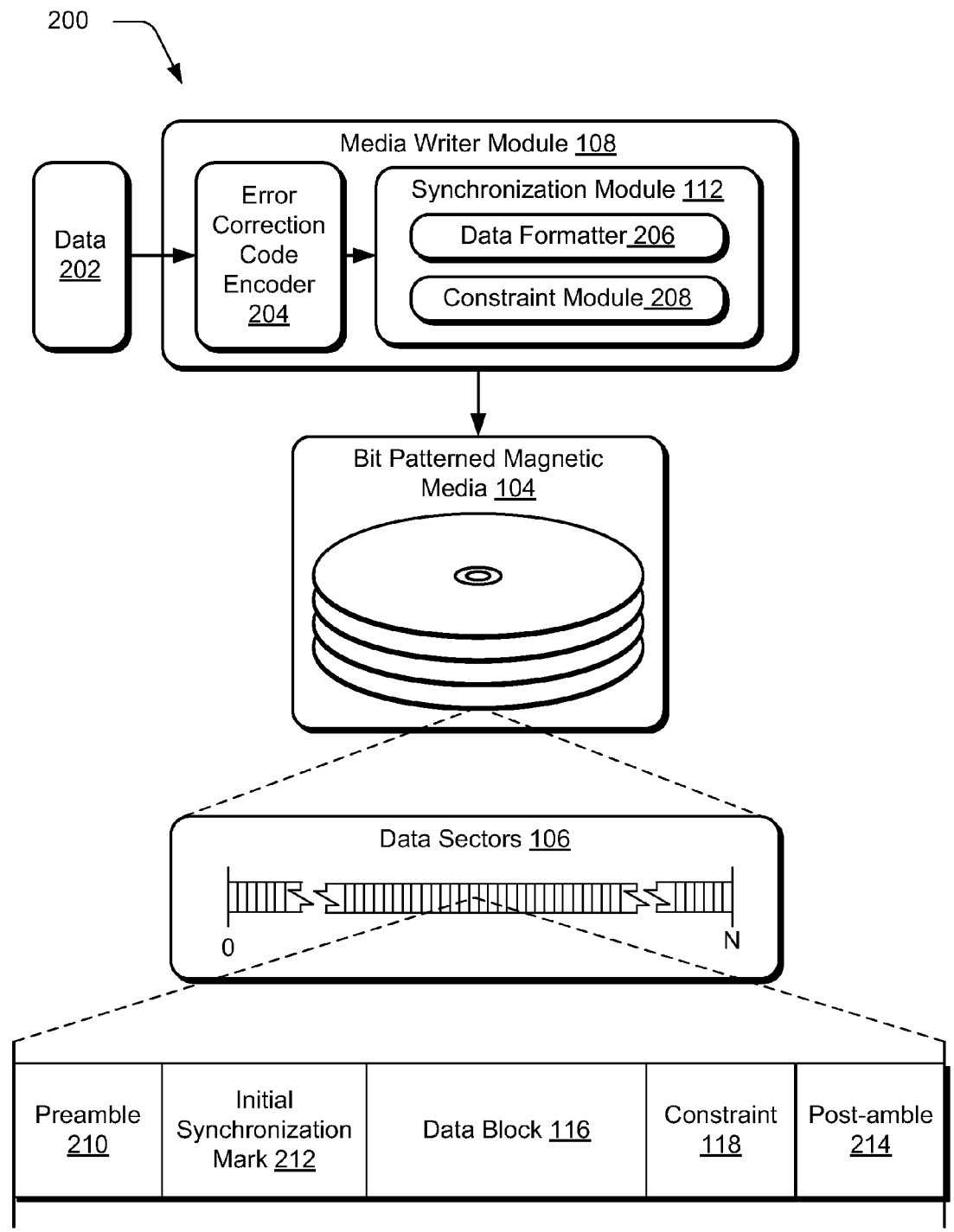
FIG. 2 is an illustration of an example operating environment showing a media writer module of FIG. 1 in greater detail.

FIG. 2 illustrates an example operating environment 200 showing the media writer module 108 of FIG. 1 in greater detail. In the operating environment 200 of FIG. 2, data 202 is illustrated as being received at the media writer module 108. The data 202 may originate from a wide variety of sources, such as an application executing on a computer that employs the media writer module 108, from a wireless interface, within the media drive 102 itself (such as for re-encryption of data stored on the bit patterned magnetic media 104), and so on.

The media writer module 108 includes an error correction code encoder 204 that is representative of functionality of the media writer module 108 to encode the data 202 in accordance with one or more error correction techniques. For example, the error correction code encoder 204 may add check bits to the data 202 when not formatted. The check bits may be used to help recover the data 202 in an event that an error occurs when reading or writing the data 202 to the bit patterned magnetic memory 104. A variety of other error correction code techniques are also contemplated.

The synchronization module 112 is illustrated as including a data formatter 206 and a constraint module 208. The data formatter 206 is representative of one or more modules that are configured to format data received from the error correction code encoder 204 for writing to the bit patterned magnetic media 104.

For example, the data formatter 206 may construct information that is used to form the data sectors 106. This information may include a preamble 210. The preamble 210 identifies the data sector 106 from other data sectors 106 included on the bit patterned magnetic media 104 such that data sector 106 and consequently data in the data sector 106 may be located.

The information may also include an initial synchronization mark 212 that is used to identify where data (e.g., the data block 116) is located in the data sector. The initial synchronization mark 212 indicates from what part of the data sector 106 the data block 116 is available. The information constructed by the data formatter 206 may also include a post-amble 214 that identifies an end of the data sector 106 and consequently an end of the data block 116 and constraint 118. The data formatter 206 may form each of the data sectors 106 to include a matching amount of data in the data block 116, although other non-matching implementations are also contemplated. Other information may also be provided by the data formatter 206 to form the data sector 106.

The constraint module 208 is representative of functionality of the media writer module 108 to calculate one or more constraints, an example of which is illustrated by constraint 118. The constraint 118 is illustrated as within a payload of the data sector 106 that includes the data block 116. However, in other implementations the constraint 118 may be stored in a variety of different locations, e.g., within and/or outside of the data sector 106 having the data block 116. Additionally, although a single constraint 118 is illustrated as within the payload of the data sector 106, the constraint 118 may be representative of a plurality of constraints calculated using a variety of different techniques (which may be implicit and/or explicit as previously described), an example of which may be found in relation to FIG. 4.

Figure 3:
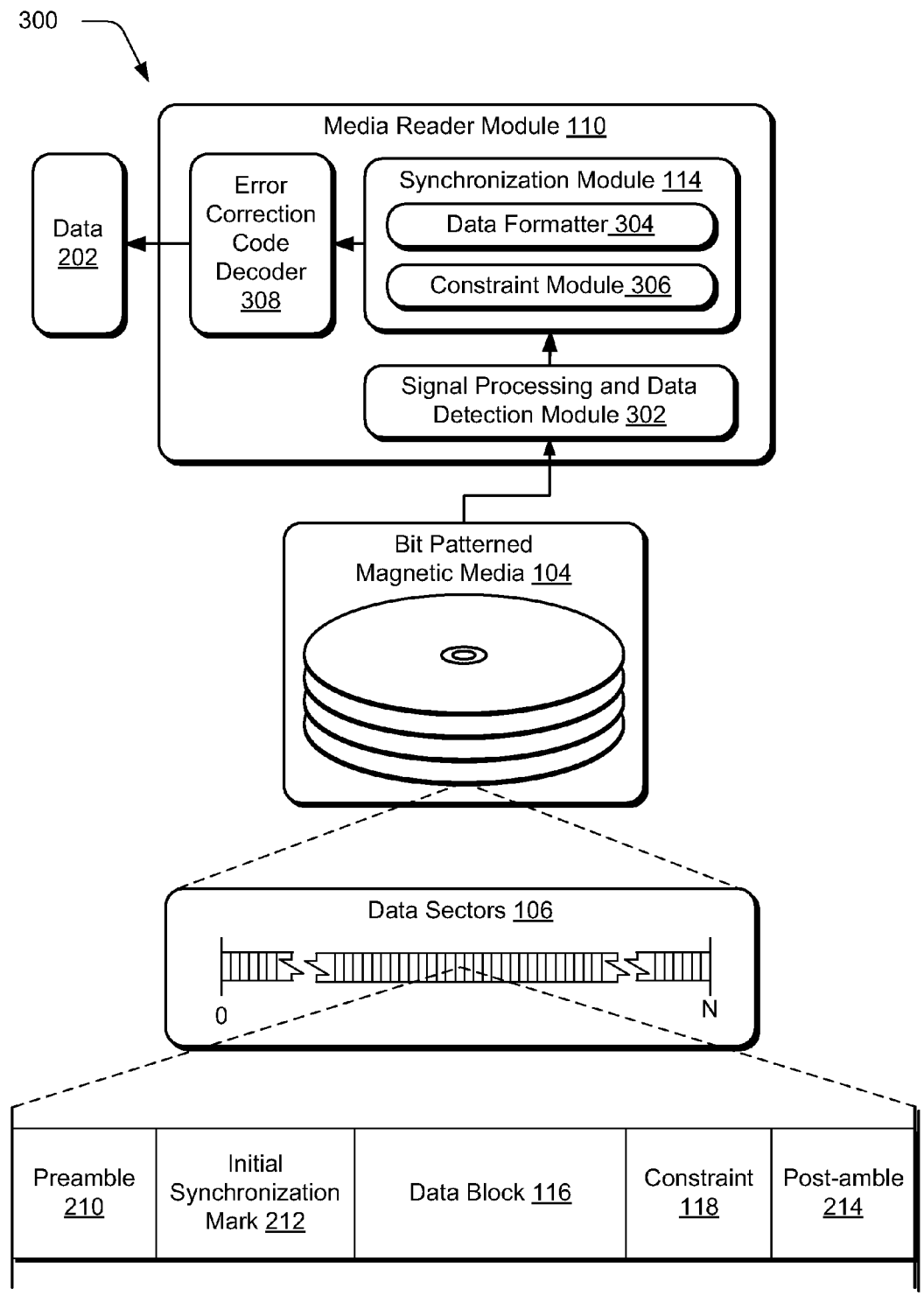
FIG. 3 is an illustration of an example operating environment showing a media reader module of FIG. 1 in greater detail as reading data from bit patterned magnetic media that was written by the media writer module of FIG. 2.

FIG. 3 is an illustration of an example operating environment 300 showing the media reader module 110 of FIG. 1 in greater detail as reading data from the bit patterned magnetic media 104 that was written by the media writer module 108 of FIG. 2. The media reader module 110 is illustrated as including a signal processing and data detection module 302, a synchronization module 114 having a data formatter 304 and a constraint module 306, and an error correction code decoder 308.

The signal processing and data detection module 302 is representative of functionality of the media reader module 110 or read bits from islands of the bit patterned magnetic media 104. For example, the signal processing and data detection module 302 may determine a magnetic orientation of each island of magnetic material of the bit patterned magnetic media 104 using a read head and compute a corresponding "one" or "zero" for a bit stored using the island.

The data formatter 304 is representative of one or more modules that are configured to read a data format employed by the data sectors 106. For example, the data format may be specified by the media writer module 108, and more particularly the data formatter 206 and thus include the preamble 210, initial synchronization mark 212, post-amble 214, and so on as previously described in relation to FIG. 2.

The constraint module 306 is representative of functionality of the media reader module 110 to read the constraint 118, which may be inserted by the constraint module 208 of the media writer module 108 of FIG. 2 and/or implicit as previously described. The constraint module 206 is also representative of functionality to calculate a constraint from data received from the data formatter 304. Thus, the constraint module 306 may function to detect and localize bit insertions or omissions and subsequently synchronize the data. A variety of other examples are also contemplated, further discussion of which may be found in relation to FIGS. 4-8.

The error correction code decoder 308 is representative of functionality of the media reader module 110 to employ one or more error correcting techniques on unformatted data received from the synchronization module 114, e.g., data that is not formatted for storage on the data sectors 106 by the data formatter 206 of FIG. 2. For example, the error correction code decoder 308 may recover the data 202 in an event that an error occurs using one or more check bits inserted by the error correction code encoder 204 of FIG. 2. A variety of other error correction code techniques may also be employed by the error correction code decoder 308 and the error correction code encoder 204 of FIG. 2, such as error correction codes designed for bit-insertion and omission and conventional error correction codes such as Reed-Solomon.

Thus, using block encoding, an error correction code coded data sequence may be segmented into data blocks using a synchronization module 112 of the media writer module 108 of FIG. 2. A constraint 118 may then be calculated for each of the data blocks 116 by the constraint module 208 and written to the bit patterned magnetic media 104 or be implicit within the data block itself. During data readout, the constraint 118 for each data block 116 is examined to determine if there is a violation, e.g., a calculated constraint does not match the constraint 116 read from the bit patterned magnetic media 104. In the event that the data is corrupted (e.g., a bit insertion or omission), the imposed constraints may be violated for the data blocks that follow the insertion/omission instance at least part of the time. Accordingly, the synchronization module 114 of the media reader module 110 may act to detect a point at which the constraint violation began and subsequently localize the insertion/omission time instance, further discussion of which may be found in relation to the following figures.

Generally, any of the functions described herein can be implemented using software, firmware (e.g., fixed logic circuitry), manual processing, or a combination of these implementations. The terms "module," "functionality," and "logic"

as used herein generally represent software, firmware, or a combination of software and firmware. In the case of a software implementation, the module, functionality, or logic represents program code that performs specified tasks when executed on a processor (e.g., CPU or CPUs). The program code can be stored in one or more computer readable memory devices, such as memory, bit patterned magnetic media, and so on. The features of the bit patterned magnetic media data constraint techniques described below are platform-independent, meaning that the techniques may be implemented on a variety of commercial computing platforms having a variety of processors.

Example Procedures

Figure 4:
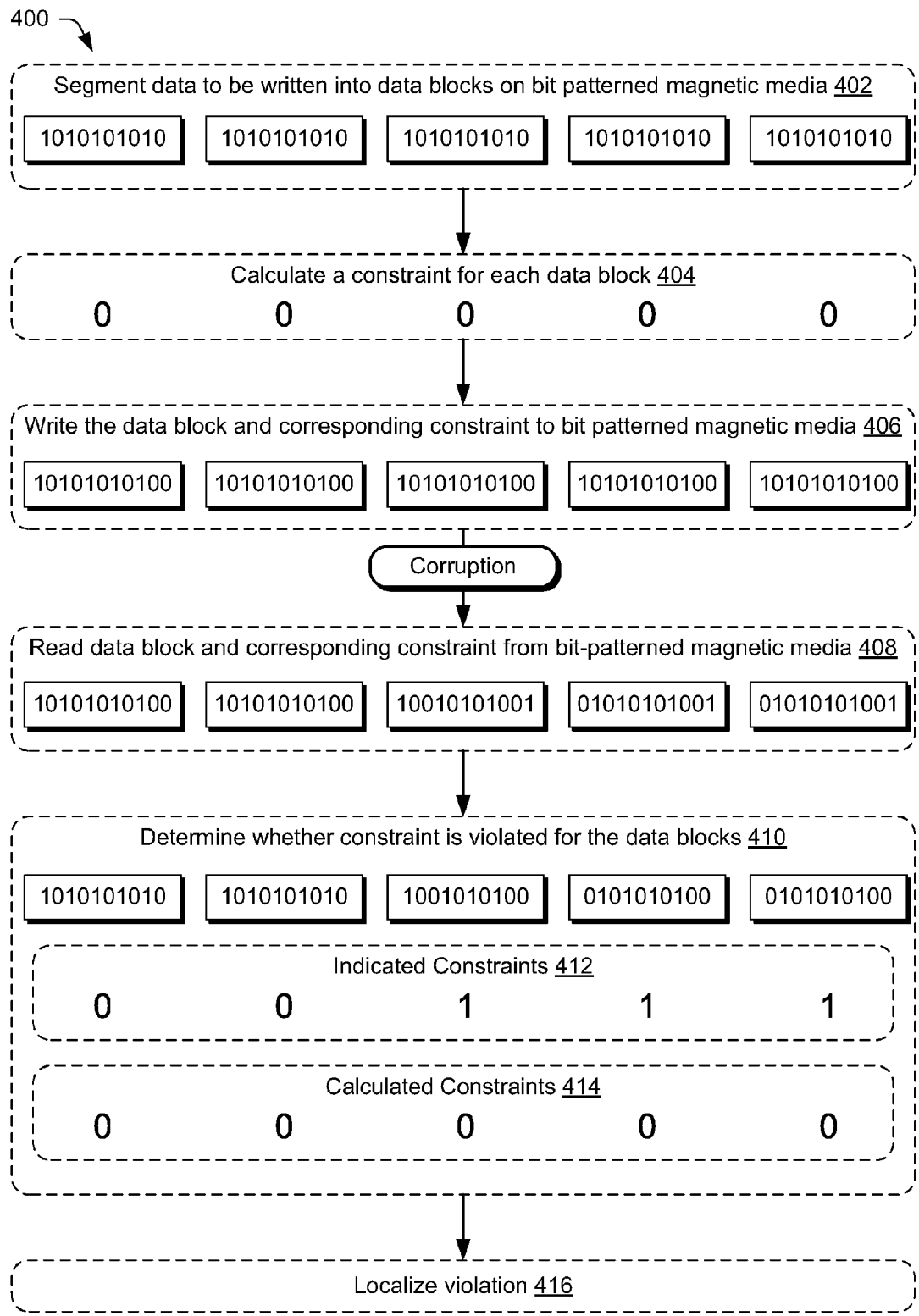
FIG. 4 is a flow diagram that depicts a procedure in an example implementation in which a constraint is applied using a parity code.

FIG. 4 depicts a procedure 400 in an example implementation in which a constraint is applied using a parity code. The following discussion may be implemented utilizing the previously described systems and devices, as well as other systems and devices subsequently described. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks.

Data to be written to data blocks on bit patterned magnetic media is segmented (block 402). As illustrated in block 402 of FIG. 4, five data blocks are shown each having 10 bits. Although each of the illustrated data blocks is illustrated as including an alternating sequence of ones and zeros for sake of clarity of the discussion, it should be readily apparent same principle applies for any bit sequences.

A constraint is imposed for each data block (block 404). For example, a single parity code may be employed in which a single bit is calculated for each data block based on the data in that data block. For instance, a "0" may be calculated for the first data block through an XOR operation. Because each of the illustrated data blocks in the example includes matching data, a "0" is also calculated for each of the other data blocks as illustrated in block 404 in the example implementation 400.

The data block and the corresponding constraint are then written to bit patterned magnetic media (block 406). For example, as illustrated in block 406 of the example implementation 400, the ten alternating bits for the data block of block 402 and the constraint calculated in block 404 are written as a payload of a data sector at block 406. The data block and constraints may be written in a variety of different ways, such as to include a preamble 210, initial synchronization mark 212, data block 116, constraint 118 and post-amble 214 as illustrated in FIG. 2.

The data block and the corresponding constraint are read from bit-patterned magnetic media (block 408). However, as illustrated in FIG. 4 between blocks 406 and 408 a data corruption has occurred in this example implementation 400. For instance, a write error and/or a read error may have occurred such that a bit omission has been encountered. In the illustrated instance in block 408, a second "1" in the alternating sequence of bits of the second data block has been omitted, which caused a shift in the bits by the missing bit. In other words, data in each of the data blocks which follow the omission has been moved over by a single bit.

A determination is then made as to whether the constraint is violated for the data blocks (block 410). For example, the indicated constraints (block 412) may be extracted from the payload read from the bit magnetic media, examples of which are illustrated as "0", "0", "1", "1", and "1" for the respective data blocks. Constraints may also be calculated (block 414) for the data blocks, examples of which are illustrated as "0", "0", "0", "0", and "0". Thus, by comparing the indicated and the calculated constraints in this example it is apparent that a violation has occurred for the third, fourth, and fifth data blocks.

When it is determined that the constraint has been violated, the violation may be localized (block 416) using a variety of techniques. For example, the localization may include examining a first data block at which a violation occurred and/or a predetermined number of data blocks before the violation, such as to determine whether the error occurred at a previous data block but due to confirmation of the data in the data block an error a violation was not indicated.

Thus, in this example, a single parity bit is inserted after a fixed number of encoded bits. When there is a corruption (e.g., bit insertion or omission), the parities are violated approximately half of the time after the corruption. A variety of other examples are also contemplated, further discussion of which may be found in relation to the following figures.

Figure 5:
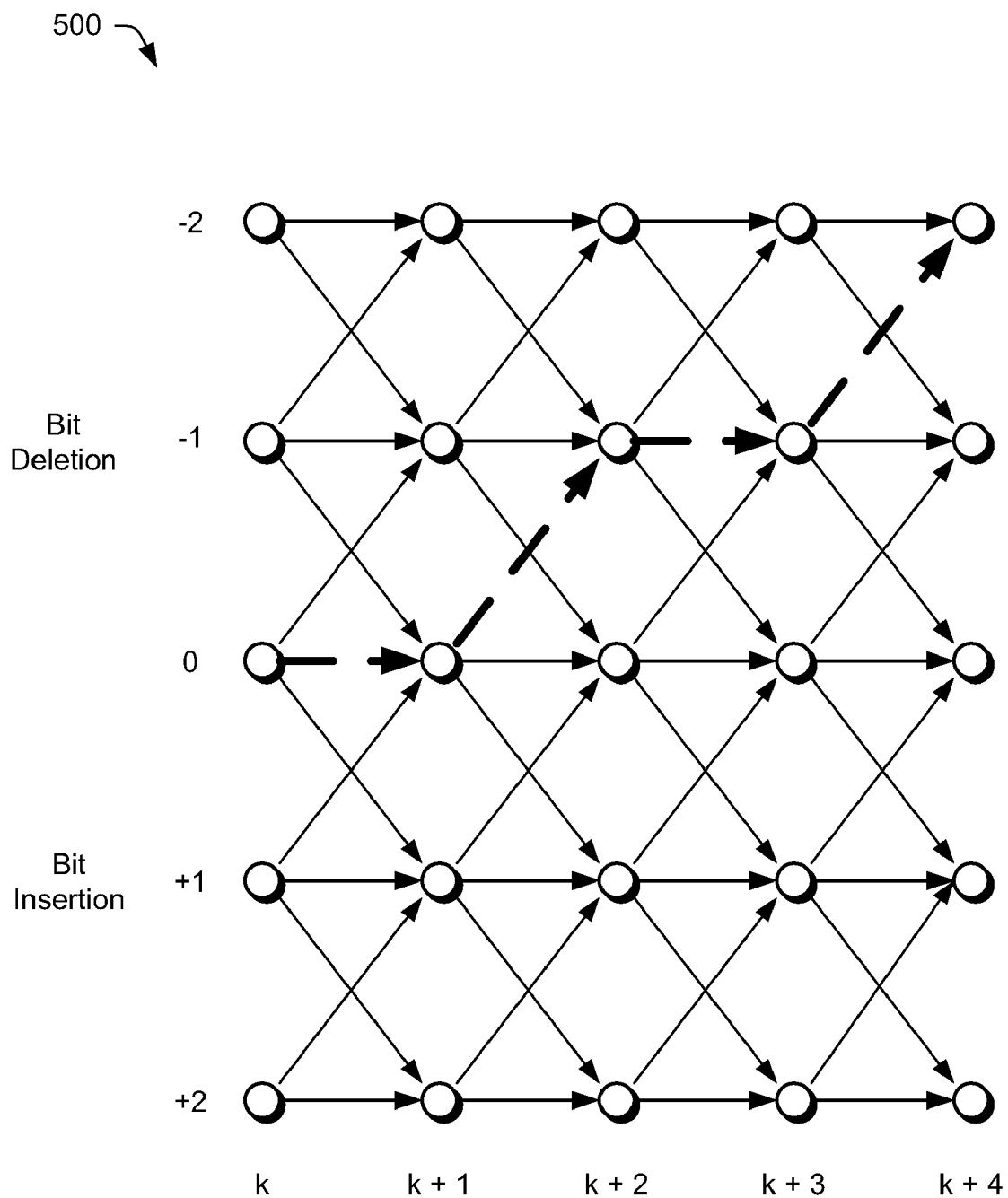
FIG. 5 is an illustration of an example implementation in which a trellis-based technique is employed to detect a position at which imposed constraints begin a violation in a received sequence of data.

FIG. 5 illustrates an example implementation 500 in which a trellis-based technique is employed to detect a position at which imposed constraints begin a violation in a received sequence of data. In the illustrated example, a Viterbi algorithm (VA) is employed to detect a position (e.g., a point in time) at which a constraint violation begins in a received sequence of data. The states of the Viterbi illustrated on the left side of the figure represent a number of insertions or omissions starting at a beginning of the data sequence. The bottom of the figure is illustrated as beginning at time "k" and proceeds from there. In the illustrated example a two-bit omission is illustrated by the dashed line, with a first bit being omitted at time "k+1" and a second bit being omitted at time "k+4".

In the illustrated example, each trellis stage corresponds to a single data block, e.g., a single codeword of a block of code. Additionally, the trellis is illustrated as being truncated at +/−M, which is "2" in the illustrated instance to limit a number of insertions/omissions that are to be corrected in a single data block to "M". Thus, the Viterbi decision are labels as "−2", "−1", "0", "1", "2" where 0 indicates no cycle slip, +1 indicates a one-bit insertion, −1 indicates a one-bit omission, +2 indicates a two-bit insertion, and −2 indicates a two-bit omission.

The branch metric for state "s" to "s" from time k to k+1 may be calculated as follows:

$$BM(s, s, k) = \min_{c \in C} \left( \sum_{i=0}^{n-1} -c_j L(k \cdot n + s + i) \right)$$ Equation 1 where c is any codeword in the block code codeword ensemble, $c_j$ is the j-th bit in the codeword (+1 or −1), $L(k \cdot n + i + s)$ is a log-likelihood ratio of the $(k \cdot n + i + s)$-bit in the received sequence and n is the codeword length of the block code.

The branch metric for transitions (e.g., from s to s+1 or s to s−1) may be assigned in an ad-hoc way. For example, the transitions may indicate bit insertion/deletions in the blocks; however, the positions are unknown. Thus, there is no systematic way of assigning a branch value, although a constant may be assigned to each of the transition branches. For instance, the assignment may be made as follows:

$BM(s,s+1)=BM(s+1,s+1)$ $BM(s,s-1)=BM(s-1,s-1)$

Figure 6:
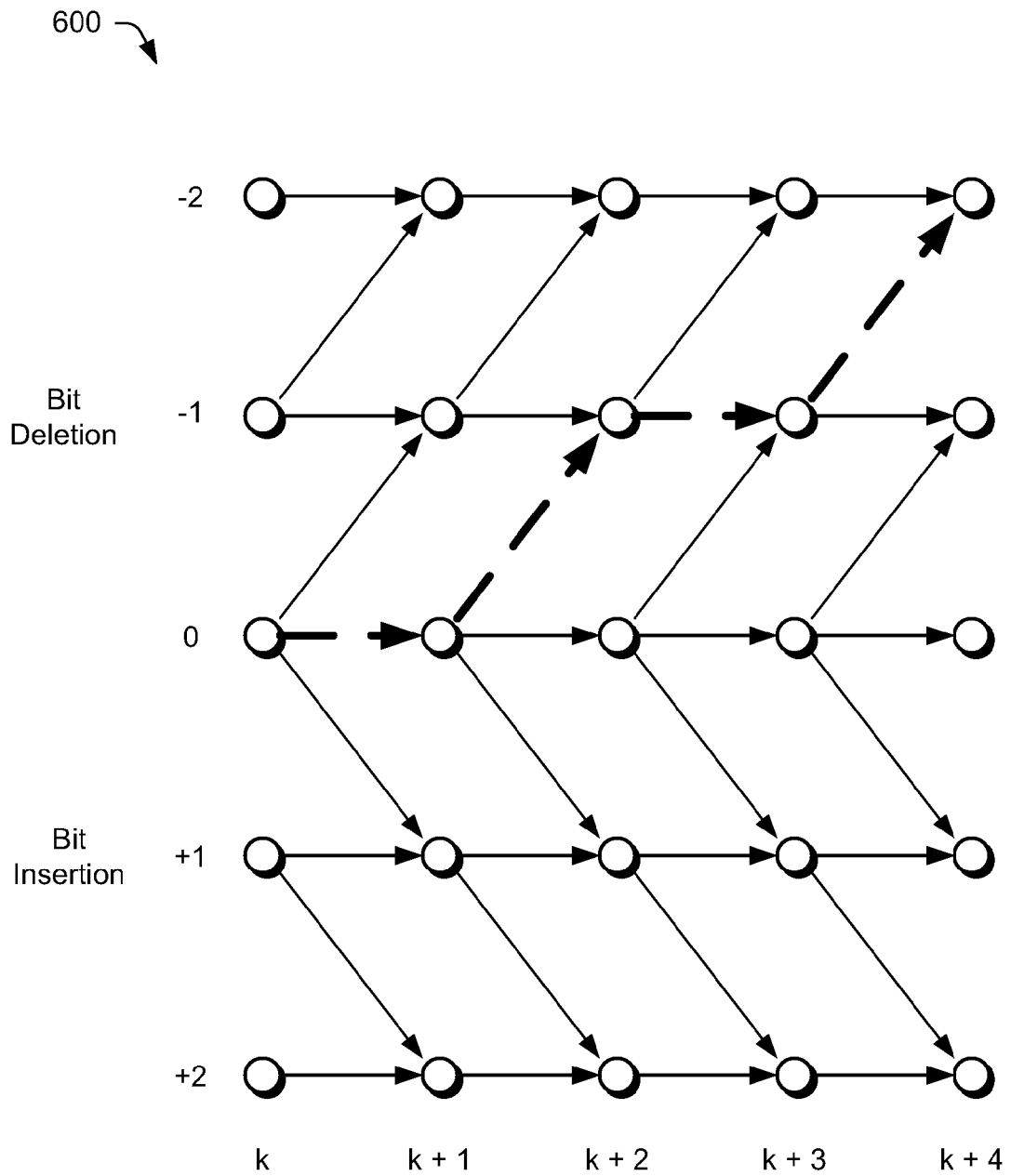
FIG. 6 is an illustration of another example implementation in which a trellis-based technique is employed to detect a position at which imposed constraints are violated in a received sequence of data.

FIG. 6 illustrates another example implementation 600 in which a trellis-based technique is employed to detect a position at which imposed constraints are violated in a received sequence of data. As before, the state is illustrated on the left side of the figure to represent a number of insertions or omissions since a beginning of a data sequence. The bottom of the figure is illustrated as beginning at time "k" and proceeds from there. As before, a two-bit omission is illustrated by the dashed line, with a first bit being omitted at time "k+1" and a second bit being omitted at time "k+4".

The trellis structure of FIG. 6, however, is a simplified structure to be employed for patterned media record applications. For example, within a data sector 106, it is likely that either an insertion or omission has occurred, not both. Therefore, some transitions may be removed from the trellis structure as illustrated in FIG. 6. The trellis may be further simplified, an example of which is illustrated in the following figure.

Figure 7:
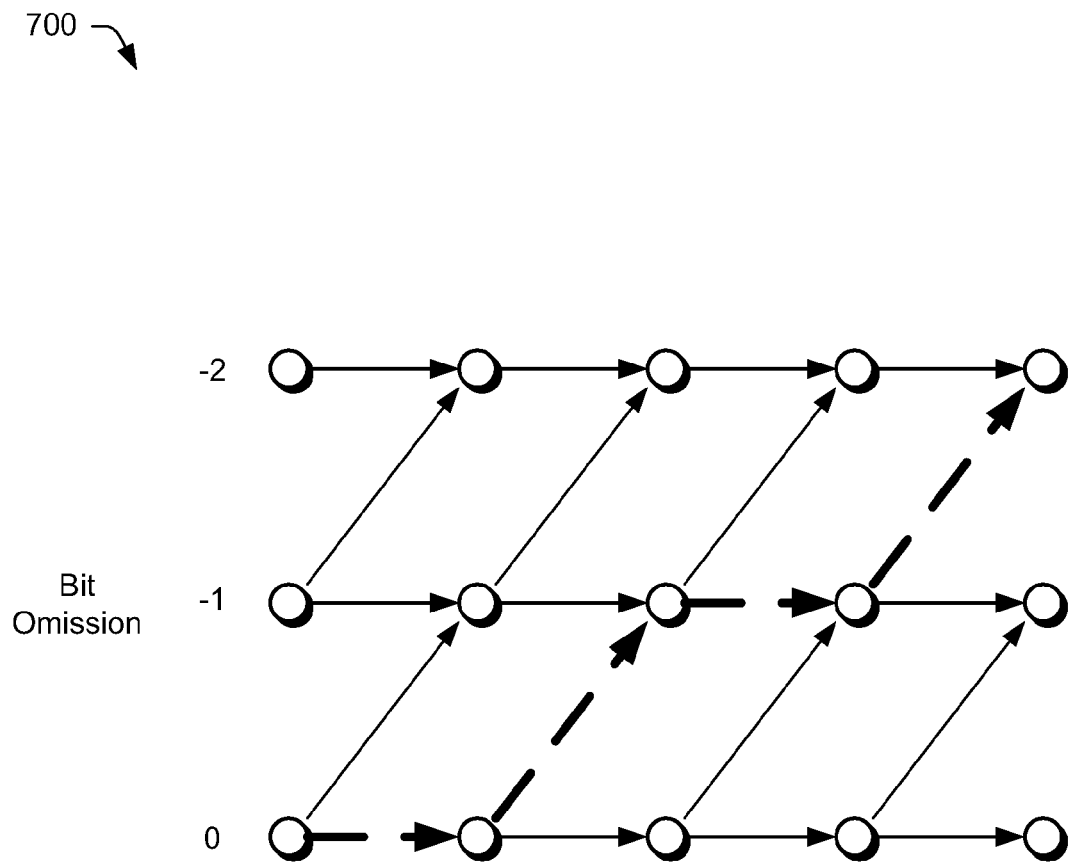
FIG. 7 is an illustration of yet another example implementation in which a trellis-based technique is employed to detect a position at which imposed constraints are violated in a received sequence of data.

FIG. 7 illustrates yet another example implementation 700 in which a trellis-based technique is employed to detect a position at which imposed constraints begin to get violated in a received sequence of data. The trellis in this instance is one-sided (in this case for bit omissions) based on knowledge of whether the corruption is likely to involve either a bit insertion or omission. This prior knowledge of the type of corruption (e.g., bit insertion or omission) may be gained in a variety of ways.

For examples, synchronization marks at the beginning and end of a data sequence (e.g., the initial synchronization mark 212 and the post-amble 214 as shown in FIG. 2 for the data sector 106). If the data sequence is longer than expected (e.g., contains more than a deterministic number of bits), an insertion may have occurred. If the data sequence is shorter than expected, an omission may have occurred. A variety of other examples are also contemplated.

Figure 8:
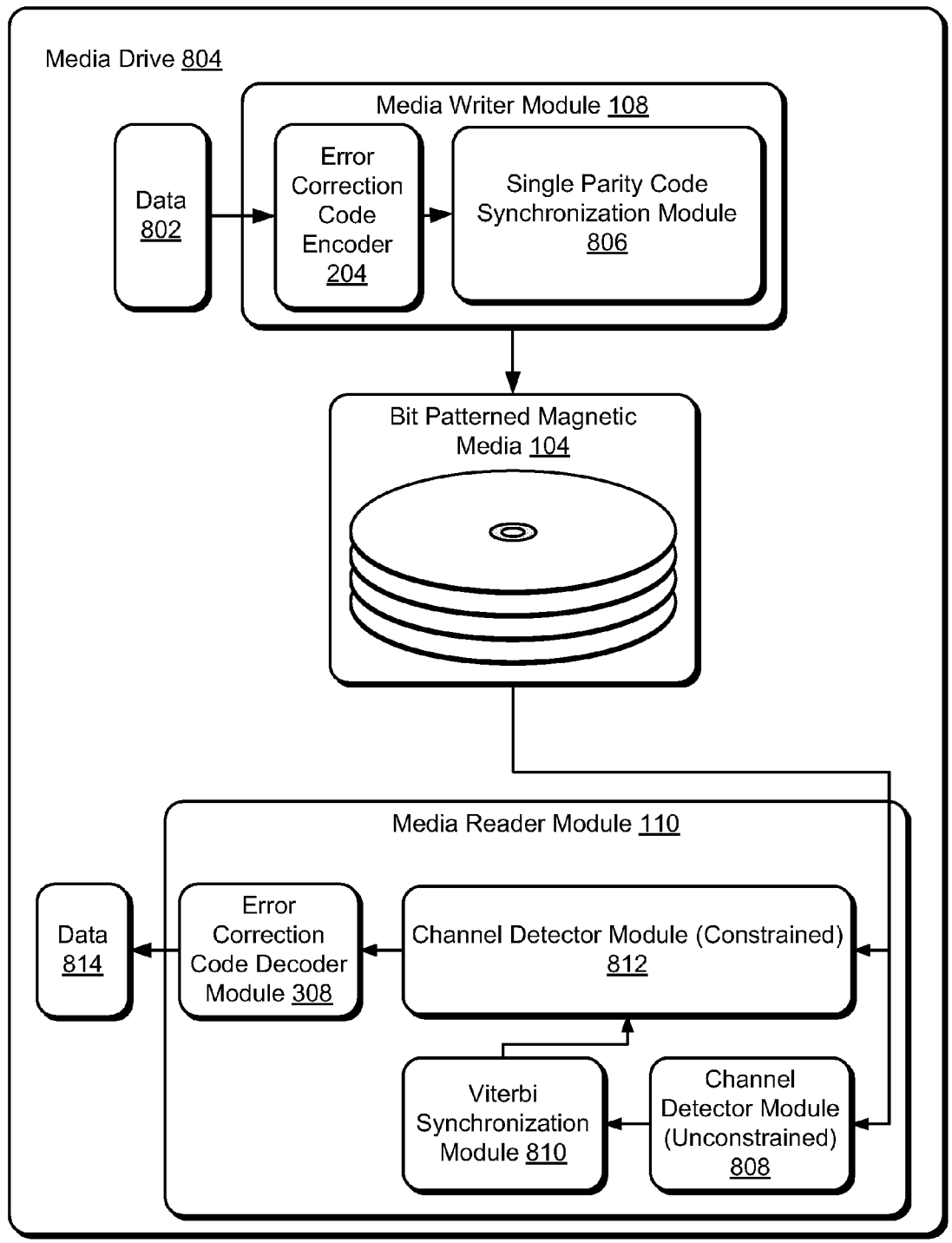
FIG. 8 depicts an example implementation of an architecture to record data on a media drive having bit patterned magnetic media.

FIG. 8 depicts an example implementation of an architecture 800 to record data 802 on a media drive having bit patterned magnetic media 104. Data 802 is illustrated as being received by the error correction code encoder 204 of the media writer module 108. In this instance, a single parity code synchronization module 806 receives encoded data from the error correction code encoder 204. For example, the single parity code synchronization module 806 may calculate a single parity code e.g., the 10/11 single parity code described earlier where a single parity bit is inserted for each 10 bit ECC coded data block. The encoded data and the single parity bit are then written by the media writer module 108 to the bit patterned magnetic media 104.

The media reader module 110 may then read the data from the bit patterned magnetic media 104. A waveform read back from the bit patterned magnetic media 104 is first detected using a channel detector module (unconstrained) 808 that does not exploit the single parity code. After synchronization by the Viterbi synchronization module 810, a second channel detector represented by the channel detect module (constrained) 812 is employed to exploit the single parity code constraint.

In an implementation, the Viterbi synchronization module 810 receives a hard decision output from the channel detector module (unconstrained) 808. A parity bit is calculated for each state s in the trellis at time k as follows:

$$P(s, k) = \sum_{i=0}^{n-1} a(k \cdot n + k + s) \text{module } 2$$

The branch metric for transition from state $s_1$ to state $s_2$ is assigned as follows:

$$MB(s_1, s_2, k) = \begin{cases} 0 & P(s_2, k) = 0 \\ A & \text{otherwise} \end{cases} \quad \text{Equation 2}$$

Thus, in the architecture 800 of FIG. 8, the single parity code which is used for bit insertion/omission detection may serve a dual purpose to enhance a bit error rate. A first channel detector (e.g., the channel detector module (unconstrained) 808) does not exploit the single parity constraint as there is possibility of bit insertion/omission, which prevents one from employing the single parity check during detection due to the signal samples are not aligned with the single parity code. After the Viterbi synchronizer employed by the Viterbi synchronization module 810, bit insertion/omission is identified and localized. Accordingly, a single parity check may then be utilized by the second channel detector (e.g., the channel detector module (constrained) 812) for a second pass detection as now the signal samples are aligned to the single parity check code. In this way, the single parity check code can noticeably improve the bit error rate and thus the ECC decoding employed by the error correction code decoder module 308 may succeed with a significantly higher probability to arrive at the data 814.

Although a Viterbi algorithm has been described, a variety of other trellis-based algorithms may also be employed, such as a Bahl-Cocke-Jelinek-Raviv (BCJR) algorithm. In general, a variety of linear programming techniques may be employed by the synchronization modules 112, 114 to detect and localize bit insertions and omissions. Further, although a hard detector output has been described, a soft detector output may also be used for a single parity code based insertion/omission detector without departing from the spirit and scope thereof.

Figure 9:
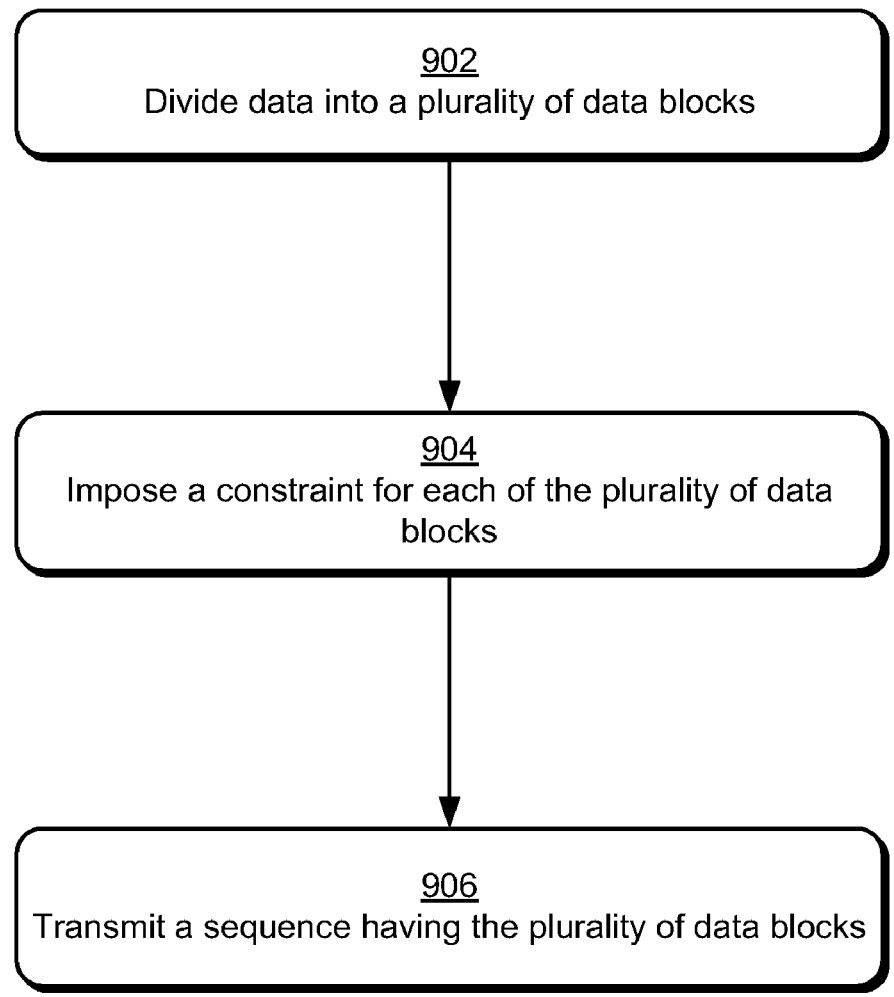
FIG. 9 illustrates a further example implementation in which encoding is described that involves a constraint which may be used to synchronize data.

FIG. 9 illustrates a further example implementation 900 in which encoding is described that involves a constraint which may be used to synchronize data. As previously described, the techniques described herein may be implemented for bit-patterned media as well as for a variety of other implementations that may suffer from bit insertion and/or deletion, such as a computer network.

Incoming data is divided into a plurality of data blocks (block 902). For example, the incoming data may be encoded by a separate ECC. In another example, the division may be performed as an integral part of ECC encoding. A variety of other examples are also contemplated. Each of the data blocks includes at least two bits of data.

A constraint is imposed for each of the plurality of data blocks (block 904). The constraint, for instance, may be explicit for each of the data blocks by calculating a value that is to be used as the constraint and storing it with the data blocks. In another instance, the imposed constraint may be implicit as previously described.

A sequence having plurality of data blocks is then transmitted (block 906) for receipt by a receiver, such as for storage on bit patterned magnetic media, communication over a computer network, and so on. Further discussion of the sequence of data blocks may be found in relation to the following figure.

Figure 10:
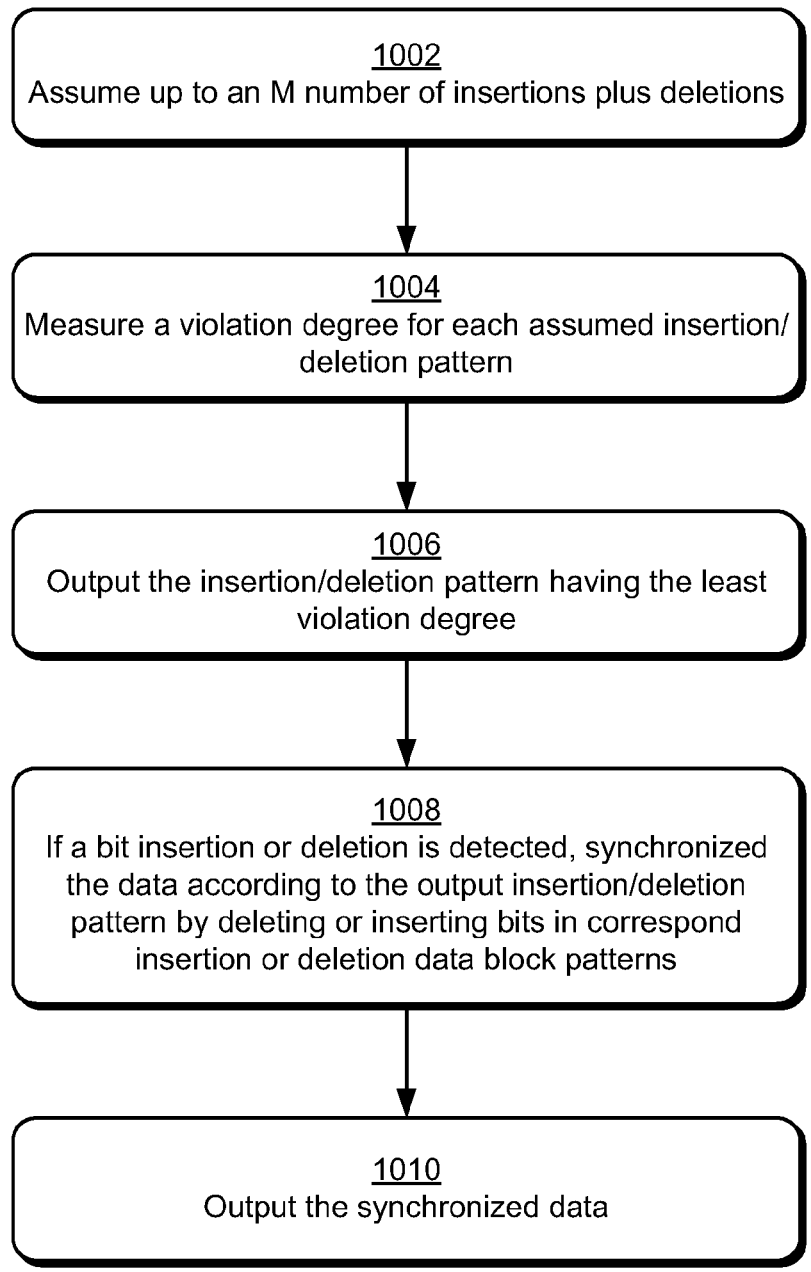
FIG. 10 illustrates a further example implementation in which decoding is described of the data encoded via the implementation of FIG. 9 that involves a constraint which may be used to synchronize data.

FIG. 10 illustrates a further example implementation 1000 in which decoding is described of the data encoded via the implementation 900 of FIG. 9 that involves a constraint which may be used to synchronize data. A decoder assumes up to an M number of insertions plus deletions (i.e., from 0 to M) for a received sequence of data (block 1002). In an implementation, M is assumed to be equal to one, although other implementations are also contemplated.

The decoder measures a violation degree for each assumed insertion/deletion pattern (block 1004) and outputs the insertion/deletion pattern having the least violation degree (block 1006). For example, linear programming (e.g., a Viterbi algorithm, BCJR algorithm, and so on) may be employed as described above to determine which insertion/deletion pattern has the least degree of violation.

If a bit insertion or deletion is detected, the data is synchronized according to the output insertion/deletion pattern by deleting or inserting bits in corresponding insertion or deletion data block locations (block 1008). The synchronized data is then output (block 1010), such as to an ECC decoder if an ECC encoder was used during encoding. For example, a metric may be assigned by measuring a minimum distance of the data block from each possible data block that satisfies the constraint, e.g., see Equation 1 above. For a block sequence, the "violation degree" may be a summation of the metrics for each of the data blocks in the sequence.

In an implementation, where the constraint indicates even parity for the data bits in a data block, a metric may be assigned as constant A if the data block has odd parity and zero otherwise, e.g., see equation 2. A variety of other metrics are also contemplated, such as block parity LLRs.

For an assumed insertion/deletion pattern, the decoder may synchronize the data by undoing an assumed bit insertion/deletion based on the received sequence. For instance, if at block k, an insertion is assumed, one bit from the block k is deleted and each of the bits that follow are shifted up by one bit. In another instance, if a deletion is assumed, a bit is inserted into block k and each of the bits that follow are shifted down by one bit. The "synchronized" sequence may then be divided into blocks as done in the encoding. A metric may be computed for each block formed from the "synchronized" data sequence, which may be summed to form an overall constraint violation degree for the insertion/deletion pattern. These techniques may be repeated for each assumed insertion/deletion pattern. A variety of other examples are also contemplated.

Although the subject matter has been described in language specific to structural features and/or methodological acts, it is to be understood that the subject matter defined in the appended claims is not necessarily limited to the specific features or acts described above. For example, one or more steps of procedures described above may be performed in a different order (or concurrently) and achieve desirable results. The specific features and acts described above are disclosed as example forms of implementing the claims.

What is claimed is:

1. A method comprising:
   synchronizing a set of two or more blocks of data received at a receiver based on multiple insertion/deletion patterns, the multiple insertion/deletion patterns indicating a number of insertions plus deletions;
   measuring violation degrees of the multiple insertion/deletion patterns, the violation degrees each representing a summation of metrics assigned to each of the synchronized blocks of data;
   determining an insertion/deletion pattern having a least measured violation degree; and
   re-synchronizing the set of two or more blocks of data based on the insertion/deletion pattern having the least measured violation degree.

2. The method as described in claim 1, wherein the metrics assigned to each of the synchronized blocks of data represent a respective measurement of a minimum branch metric distance of a respective said synchronized block of data from each possible block of data that satisfies a constraint imposed for the respective said synchronized block of data.

3. The method as described in claim 1, wherein the determining is performed by using linear programming or a trellis-based algorithm.

4. The method as described in claim 1, wherein the metrics assigned to each of the synchronized blocks of data are based on a block parity log-likelihood-ratio (LLR).

5. The method as described in claim 3, wherein the trellis-based algorithm is a Viterbi algorithm or a Bahl-Cocke-Jelinek-Raviv (BCJR) algorithm.

6. The method as described in claim 1, wherein if the insertion/deletion pattern having the least measured violation degree indicates a bit deletion, inserting one or more bits into a particular said block of data indicated by the insertion/deletion pattern having the least measured violation degree.

7. The method as described in claim 1, wherein if the insertion/deletion pattern having the least measured violation degree indicates a bit insertion, deleting one or more bits from a particular said block of data indicated by the insertion/deletion pattern having the least measured violation degree.

8. The method as described in claim 1, wherein the set of two or more blocks of data is part of a single data sector.

9. The method as described in claim 1, wherein the set of two or more blocks of data is read from bit patterned magnetic media.

10. The method as described in claim 1, wherein the set of two or more blocks of data is received via a computer network.

* * * * *